United States Patent
Takeuchi et al.

(10) Patent No.: US 6,958,771 B2
(45) Date of Patent: Oct. 25, 2005

(54) IMAGE PROCESSING APPARATUS WORKING IN RESPONSE TO FREQUENCY DIFFUSED CLOCK AS REFERENCE INPUT IMAGE SIGNALS

(75) Inventors: Kesatoshi Takeuchi, Shiogiri (JP); Michio Irie, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 507 days.

(21) Appl. No.: 10/281,203

(22) Filed: Oct. 28, 2002

(65) Prior Publication Data

US 2003/0108246 A1 Jun. 12, 2003

(30) Foreign Application Priority Data

Nov. 8, 2001 (JP) ....................................... 2001-343529

(51) Int. Cl.⁷ .............................................. H04N 17/00
(52) U.S. Cl. ...................... 348/194; 348/607; 331/20; 331/177 R; 713/500
(58) Field of Search ................................ 348/194, 184, 348/497, 607; 345/212; 375/144, 148, 371; 702/66, 69, 75; 713/500, 501, 503; 331/18–20, 34, 78, 67, 175, 177 R; 327/113, 141, 145, 162

(56) References Cited

U.S. PATENT DOCUMENTS

| | | | | |
|---|---|---|---|---|
| 5,142,247 A | * | 8/1992 | Lada et al. | ..................... 331/14 |
| 5,719,512 A | * | 2/1998 | Murayama | ................... 327/159 |
| 6,014,063 A | * | 1/2000 | Liu et al. | ....................... 331/78 |
| 6,046,735 A | | 4/2000 | Bassetti et al. | |
| 6,107,851 A | * | 8/2000 | Balakirshnan et al. | ....... 327/172 |
| 6,249,876 B1 | * | 6/2001 | Balakrishnan et al. | ....... 713/501 |
| 6,292,507 B1 | * | 9/2001 | Hardin et al. | ................ 375/130 |
| 6,665,019 B1 | * | 12/2003 | Pronkine | ..................... 348/540 |

FOREIGN PATENT DOCUMENTS

| | | |
|---|---|---|
| EP | 0 704 833 A2 | 4/1996 |
| EP | 1 139 324 A2 | 10/2001 |
| JP | A 61-24321 | 2/1986 |
| JP | A 9-98152 | 4/1997 |
| JP | A 10-31470 | 2/1998 |
| JP | A 2000-125149 | 4/2000 |

* cited by examiner

Primary Examiner—Victor R. Kostak
(74) Attorney, Agent, or Firm—Oliff & Berridge, PLC

(57) ABSTRACT

A system clock generation module varies an oscillation frequency and outputs a frequency diffused clock as a system clock. A synchronizing signal measurement module measures a synchronizing signal characteristic value, which includes at least a synchronizing signal period and a synchronizing signal cycle corresponding to an input image signal, relative to a measurement clock generated from the system clock as a reference. An image signal analyzing module determines that specification of the input image signal is changed when the observed synchronizing signal characteristic value is out of a predetermined range, while determining that the specification of the input image signal is unchanged when the observed synchronizing signal characteristic value is in the predetermined range. The image signal analyzing module analyzes the input image signal according to a result of the determination. This arrangement of the present invention ensures stable analysis of the specification of the input image signal.

10 Claims, 7 Drawing Sheets

Fig. 5

IMAGE PROCESSING APPARATUS WORKING IN RESPONSE TO FREQUENCY DIFFUSED CLOCK AS REFERENCE INPUT IMAGE SIGNALS

BACKGROUND OF THE INVENTION

1. Field of the Invention

The present invention relates to an image processing apparatus that works in response to a frequency diffused clock as a reference to process input image signals, and more specifically pertains to a technique of analyzing specification of an input image signal.

2. Description of the Related Art

Noises arising in a variety of electronic apparatuses may have undesirable electromagnetic interference (EMI) against operations of other electronic apparatuses. There are accordingly regulations set with regard to the noise arising in electronic apparatuses (hereafter referred to as the 'EMI noise').

Makers that develop and manufacture the electronic apparatuses have made efforts to reduce the EMI noise arising in the electronic apparatuses and make the electronic apparatuses satisfy the regulations of the EMI noise.

An electronic circuit in the electronic apparatus generally works in response to one or multiple clocks as a reference. FIG. 7 shows a frequency spectrum of a clock. As shown by a curve of solid line, the frequency spectrum of the clock has peaks of an amplitude at an oscillation frequency (fundamental wave: f1) of the clock and frequencies of its harmonic waves (f2, f3, . . . ). The frequency spectrum of the EMI noise arising in the electronic apparatus accordingly has peaks of the amplitude at the oscillation frequency (f1) of the clock and the frequencies of its harmonic waves (f2, f3, . . . ). For reduction of the EMI noise, it is required to reduce the peaks of the amplitude at the frequencies of the fundamental wave of the clock and its harmonic waves. One applicable technique for the reduction varies the oscillation frequency of the clock to diffuse the frequency spectrum as shown by a curve of broken line in FIG. 7 and thereby reduce the peaks of the amplitude at the frequencies of the fundamental wave (f1) of the clock and its harmonic waves (f2, f3, . . . ) in the frequency spectrum. In the description hereafter, the technique of varying the oscillation frequency of the clock to diffuse the frequency spectrum is referred to as 'frequency diffusion'. The variation in oscillation frequency of the clock is referred to as the 'diffusion quantity'. The greater diffusion quantity generally results in reducing the EMI noise by a greater degree.

An image display apparatus is one of the electronic apparatuses that carry out diverse series of processing synchronously with a clock as a standard of operations. Reduction of the EMI noise is thus demanded in the image display apparatus. The prior art technique for reducing the EMI noise due to the frequency diffusion in the image display apparatus, however, has a problem discussed below.

There are a diversity of specifications of the image signal based on various conditions, such as the type of the apparatus outputting the image signal (for example, a computer, a DVD player, or a video recorder) and the resolution of the image expressed by the image signal. The image signal generally does not include information that directly represents the specification of the image signal. In order to allow display of images expressed by image signals of diverse specifications, the image display apparatus analyzes the input image signal and processes the input image signal according to the analyzed specification of the image signal.

In the image display apparatus, a typical procedure of analyzing the image signal measures a synchronizing signal period, a synchronizing signal cycle, and polarity of the synchronizing signal as the synchronizing signal characteristic values and reads the specification of the image signal corresponding to the observed synchronizing signal characteristic values from a database, which has been prepared in advance. The synchronizing signal cycle and the synchronizing signal period are measured, for example, by counting measurement clocks corresponding to the synchronizing signal cycle and the synchronizing signal period. The measurement clock is typically generated in response to a system clock, which is a standard of operations in the image display apparatus.

In the image display apparatus, frequency diffusion of the system clock as the standard of operations in order to reduce the EMI noise results in frequency diffusion of the measurement clock, which is generated from the system clock. The frequency diffusion of the measurement clock may cause a variation in observed synchronizing signal characteristic value with a variation in oscillation frequency. This leads to wrong analysis that the specification of the image signal is changed, while the specification of the image signal is actually unchanged. It is accordingly difficult to reduce the EMI noise due to the frequency diffusion in the image display apparatus.

The drawback of the prior art technique discussed above is not restricted in the image display apparatus, but commonly arises in image processing apparatuses that work in response to a clock as a standard of operations and process image signals.

SUMMARY OF THE INVENTION

The object of the present invention is thus to provide a technique that ensures stable analysis of specification of an input image signal in an image processing apparatus, which works in response to a frequency diffused clock as a reference to process the input image signal.

In order to attain at least part of the above and the other related objects, the present invention is directed to a first image processing apparatus that works in response to a frequency diffused clock as a reference to process an input image signal. The first image processing apparatus includes: a system clock generation module that outputs a system clock, which is a standard of operations; a synchronizing signal measurement module that measures a synchronizing signal characteristic value, which includes at least a synchronizing signal period and a synchronizing signal cycle corresponding to the input image signal, relative to a measurement clock generated from the system clock as a reference; and an image signal analyzing module that analyzes the input image signal based on the observed synchronizing signal characteristic value. The system clock generation module varies an oscillation frequency and outputs a frequency diffused clock as the system clock. The image signal analyzing module determines that specification of the input image signal is changed when the observed synchronizing signal characteristic value is out of a predetermined range, while determining that the specification of the input image signal is unchanged when the observed synchronizing signal characteristic value is in the predetermined range. The image signal analyzing module analyzes the input image signal according to a result of the determination.

The term 'frequency diffusion' here represents a process of varying the oscillation frequency of the clock to diffuse a frequency spectrum.

In the first image processing apparatus of the present invention, the system clock is frequency diffused. In the case of a variation in frequency of the measurement clock, which is generated from the system clock as the reference, it is determined that the specification of the input image signal is changed when the observed synchronizing signal characteristic value is out of the predetermined range. It is determined that the specification of the input image signal is unchanged, on the other hand, when the observed synchronizing signal characteristic value is in the predetermined range. The arrangement of the first image processing apparatus determines whether the specification of the input image signal is changed or unchanged by taking into account the variation in synchronizing signal characteristic value with a variation in frequency of the measurement clock. This ensures stable analysis of the specification of the input image signal.

In accordance with one preferable application of the first image processing apparatus, the system clock generation module outputs a first frequency diffused clock, which is obtained by frequency diffusion with a first diffusion quantity, as the system clock during a measurement time period when the synchronizing signal measurement module measures the synchronizing signal characteristic value, while outputting a second frequency diffused clock, which is obtained by frequency diffusion with a second diffusion quantity, as the system clock during a time period other than the measurement time period.

It is preferable that the first diffusion quantity is smaller than the second diffusion quantity.

The term 'diffusion quantity' here represents a variation in oscillation frequency of the clock due to the frequency diffusion.

The above application changes the variation in frequency of the measurement clock during the measurement time period when the synchronizing signal characteristic value is measured and during the time period other than the measurement time period. This arrangement adequately reduces the EMI noise during the time period other than the measurement period, while enabling the specification of the input image signal to be analyzed with a high accuracy during the measurement time period.

In one preferable embodiment of the first image processing apparatus, the system clock generation module includes: a first frequency diffusion clock generation sub-module that generates the first frequency diffused clock; a second frequency diffusion clock generation sub-module that generates the second frequency diffused clock; and a selector sub-module that selects one of the first frequency diffused clock and the second frequency diffused clock.

In another preferable embodiment of the first image processing apparatus, the system clock generation module has a frequency diffusion clock generation sub-module that carries out a selection between the first diffusion quantity and the second diffusion quantity and generates a frequency diffused clock corresponding to the selected diffusion quantity.

The system clock generation module of either construction outputs the first frequency diffused clock during the measurement time period, while outputting the second frequency diffused clock during the time period other than the measurement time period.

The present invention is also directed to a second image processing apparatus that works in response to a frequency diffused clock as a reference to process an input image signal. The second image processing apparatus includes: a system clock generation module that outputs a system clock, which is a standard of operations; a synchronizing signal measurement module that measures a synchronizing signal characteristic value, which includes at least a synchronizing signal period and a synchronizing signal cycle corresponding to the input image signal, relative to a measurement clock generated from the system clock as a reference; and an image signal analyzing module that analyzes the input image signal based on the observed synchronizing signal characteristic value. The system clock generation module outputs a single frequency clock having a substantially fixed oscillation frequency as the system clock during a measurement time period when the synchronizing signal measurement module measures the synchronizing signal characteristic value, while varying an oscillation frequency and outputting a frequency diffused clock as the system clock during a time period other than the measurement time period. The image signal analyzing module determines that specification of the input image signal is changed when the observed synchronizing signal characteristic value is out of a predetermined range, while determining that the specification of the input image signal is unchanged when the observed synchronizing signal characteristic value is in the predetermined range. The image signal analyzing module analyzes the input image signal according to a result of the determination.

Like the first image processing apparatus discussed above, the second image processing apparatus of the present invention ensures stable analysis of the specification of the input image signal. The second image processing apparatus generates the measurement clock in response to the single frequency clock having the substantially fixed oscillation frequency during the measurement time period. This arrangement enables the specification of the input image signal to be analyzed more stably with a higher accuracy, compared with the first image processing apparatus.

In one preferable embodiment of the second image processing apparatus, the system clock generation module includes: a single frequency clock generation sub-module that generates the single frequency clock; a frequency diffusion clock generation sub-module that generates the frequency diffused clock; and a selector sub-module that selects one of the single frequency clock and the frequency diffused clock.

In another preferable embodiment of the second image processing apparatus, the system clock generation module has a frequency diffusion clock generation sub-module that carries out a selection between frequency diffusion and non-frequency diffusion and generates one of the single frequency clock and the frequency diffused clock.

The system clock generation module of either construction outputs the single frequency clock during the measurement time period, while outputting the frequency diffused clock during the time period other than the measurement time period.

These and other objects, features, aspects, and advantages of the present invention will become more apparent from the following detailed description of the preferred embodiments with the accompanying drawings.

BRIEF DESCRIPTION OF THE DRAWINGS

FIG. 5 is a block diagram schematically illustrating the construction of still another image display apparatus in a third embodiment of the present invention;

DESCRIPTION OF THE PREFERRED EMBODIMENTS

A. First Embodiment

A1. Construction of Image Display Apparatus

Figure 1:
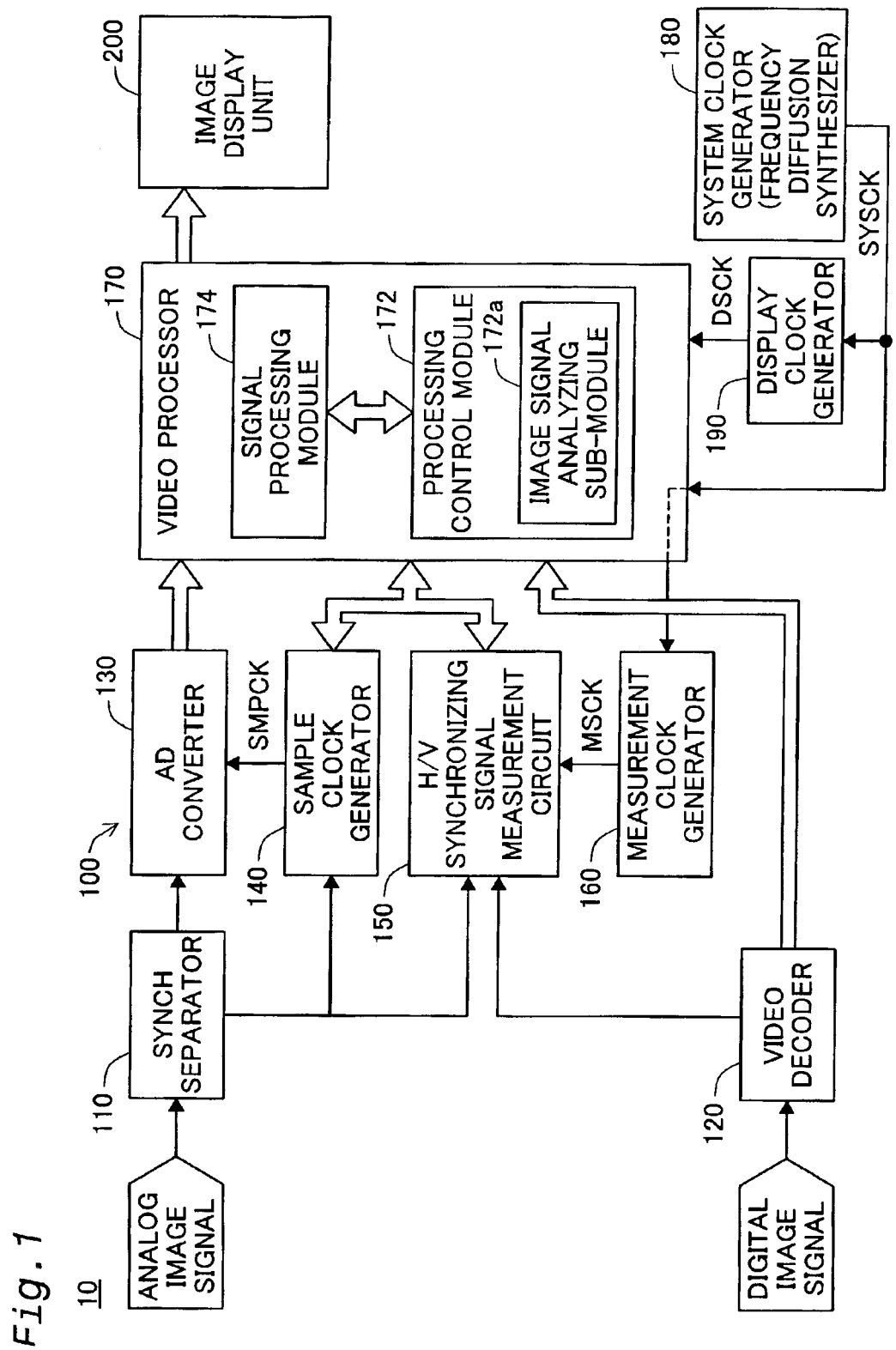
FIG. 1 is a block diagram schematically illustrating the construction of an image display apparatus in a first embodiment of the present invention.

FIG. 1 is a block diagram schematically illustrating the construction of an image display apparatus 10 in a first embodiment of the present invention. The image display apparatus 10 includes an image processing unit 100 as the image processing apparatus of the present invention and an image display unit 200. The image processing unit 100 includes a synch separator 110, a video decoder 120, an AD converter 130, a sample clock generator 140, an H/V synchronizing signal measurement circuit 150, a measurement clock generator 160, a video processor 170, a system clock generator 180, and a display clock generator 190.

The system clock generator 180 generates a system clock SYSCK, which is a standard of the operations of the image processing unit 100 and the image display unit 200. The system clock generator 180 varies the oscillation frequency of the system clock SYSCK to output a clock of a diffused frequency spectrum (hereafter this clock may be referred to as the 'frequency diffused clock'). For example, a clock generator MK1705 manufactured by ICS or a clock generator disclosed in JAPANESE PATENT LAID-OPEN GAZETTE No. 9-98152 is applicable for the system clock generator 180 that outputs the frequency diffused clock. The clock generator MK1705 is used in this embodiment.

The display clock generator 190 generates a display clock DSCK, which is a standard of the behaviors of signals supplied to the image display unit 200, in response to the system clock SYSCK. A PLL-based synthesizer is applicable for the display clock generator 190. The display clock DSCK may not be generated in response to the system clock SYSCK, but may be generated independently of the system clock SYSCK.

The system clock SYSCK and the display clock DSCK are supplied to the video processor 170 to be processed to a diversity of clocks and used as timing signals of various series of corresponding processing.

The video processor 170 includes a processing control module 172 and a signal processing module 174. The signal processing module 174 writes image data included in digital image signals, which are supplied from the AD converter 130 and the video decoder 120, into a frame memory (not shown), while reading out image data written in the frame memory. Various series of image processing are executed in this reading and writing process. The writing operation into the frame memory is based on the system clock SYSCK, while the reading operation from the frame memory is based on the display clock DSCK.

The processing control module 172 is a computer system including a CPU and memories like a RAM and a ROM (not shown). The CPU executes programs stored in the memory to control the diverse operations of the image processing unit 100 and the image display unit 200. The image processing module 172 has functions of an image signal analyzing sub-module 172a. The image signal analyzing sub-module 172a analyzes the input image signal, based on synchronizing signal characteristic values supplied from the H/V synchronizing signal measurement circuit 150 as described below.

The H/V synchronizing signal measurement circuit 150 receives an instruction of measuring synchronizing signal characteristic values output from the video processor 170, and measures synchronizing signal characteristic values in response to a measurement clock MCK supplied from the measurement clock generator 160 as discussed later. The synchronizing signal characteristic values include, for example, a synchronizing signal period Tvw and a synchronizing signal cycle Tvc of a vertical synchronizing signal VD and a synchronizing signal period Thw and a synchronizing signal cycle Thc of a horizontal synchronizing signal HD. The H/V synchronizing signal measurement circuit 150 also specifies the polarity of the vertical synchronizing signal VD and the horizontal synchronizing signal HD. A typical counter circuit and a polarity specification circuit may be applicable for the H/V synchronizing signal measurement circuit 150.

In the description below, the synchronizing signal period Tvw of the vertical synchronizing signal VD and the synchronizing signal period Thw of the horizontal synchronizing signal HD may be represented by the synchronizing signal period Tw. The synchronizing signal cycle Tvc of the vertical synchronizing signal VD and the synchronizing signal cycle Thc of the horizontal synchronizing signal HD may be represented by the synchronizing signal cycle Tc.

The measurement clock generator 160 generates the measurement clock MCK in response to a clock supplied from the video processor 170. The clock supplied from the video processor 170 is generated by processing the system clock SYSCK and has a diffused frequency spectrum in the same manner as the system clock SYSCK.

The observed synchronizing signal characteristic values are transmitted to the video processor 170 and are utilized for analysis of the image signal by the image signal analyzing sub-module 172a. The processing control module 172 controls the operations of the signal processing module 174, the sample clock generator 140, and the other related elements, based on the analyzed specification of the image signal.

Analysis of the image signal will be discussed in detail later.

Analog image signals output from an image supply source, such as a personal computer and a DVD player, are input into the synch separator 110 via an input terminal (not shown). In the case where the analog image signal is a superimposed signal of a synchronizing signal and a signal representing a color image (hereafter referred to as the 'color image signal'), the synch separator 110 separates the synchronizing signal from the analog image signal. One typical example of the superimposed signal of the synchronizing signal and the color image signal is a composite signal like a television signal where a synchronizing signal is superimposed on a luminance signal and a color difference signal. Another typical example is a synch-on-green signal where a synchronizing signal is superimposed on a G signal among three color signals R (red), G (green), and B (blue) defining a color image (hereafter these three color signals may be collectively referred to as the 'RGB signal').

The synch separator 110 is not required when the analog image signal is a component signal, which includes the RGB signal separate from the synchronizing signal.

The separated synchronizing signal is supplied to the H/V synchronizing signal measurement circuit 150, while the horizontal synchronizing signal HD is also supplied to the sample clock generator 140.

The image processing unit 100 may have a selection circuit (not shown) to select one among multiple analog image signals input via a plurality of input terminals.

The analog image signal is supplied to the AD converter 130 via the synch separator 110. The AD converter 130 converts the analog image signal into a digital image signal in response to a sample clock SMPCK supplied from the sample clock generator 140.

The sample clock generator 140 generates the sample clock SMPCK, which is adequate for quantization of the analog image signal, in response to the horizontal synchronizing signal HD corresponding to the input analog image signal. A PLL-based synthesizer is applicable for the sample clock generator 140. The frequency of the sample clock SMPCK is determined according to setting data supplied from the video processor 170. The setting data supplied from the video processor 170 are based on the specification of the image signal analyzed by the image signal analyzing sub-module 172a.

The digital image signal converted by the SF converter 130 is transmitted to the video processor 170.

Digital image signals input via an input terminal (not shown) are received by the video decoder 120. The video decoder 120 converts the input digital image signal into a digital image signal of a specific format receivable by the video processor 170. The video decoder 120 supplies the synchronizing signal to the H/V synchronizing signal measurement circuit 150. The converted digital image signal is transmitted to the video processor 170.

The image data included in the digital image signal transmitted to the video processor 170 is subjected to diverse series of processing executed by the signal processing module 174 and is supplied to the image display unit 200.

The image display unit 200 displays an image expressed by the supplied image data. The image display unit 200 includes, for example, a liquid crystal panel and a driving circuit that drives the liquid crystal panel according to the image data supplied from the video processor 170. The image display unit 200 may function as a projection display device, which has an optical system for projecting the image formed on the liquid crystal panel. A diversity of display devices, such as a plasma display panel and a CRT may be applicable for the image display unit 200.

A2. Analysis of Image Signal

The specification of the image signal is unequivocally determined by a combination of preset factors, for example, the synchronizing signal cycle Tc and the synchronizing signal period Tw of a corresponding synchronizing signal and the polarity of the synchronizing signal. The image signal analyzing sub-module 172a accordingly causes the H/V synchronizing signal measurement circuit 150 to measure the synchronizing signal characteristic values, that is, the synchronizing signal cycle Tc, the synchronizing signal period Tw, and the polarity of the synchronizing signal. The specification of the image signal corresponding to the observed synchronizing signal characteristic values is read from a database, which has been prepared in advance.

The H/V synchronizing signal measurement circuit 150 counts the numbers of the measurement clocks MCK of a known cycle Tmck generated in the synchronizing signal cycle Tc and in the synchronizing signal period Tw. The synchronizing signal cycle Tc and the synchronizing signal period Tw are then calculated according to Expressions given below:

$$Tc = m \cdot Tmck \tag{1a}$$

$$Tw = n \cdot Tmck \tag{1b}$$

where m (m is an integer of not less than 1) denotes the count in the synchronizing signal cycle Tc, and n (n is an integer of not less than 1) denotes the count in the synchronizing signal period Tw.

The measurement clock MCK is frequency diffused as mentioned above. The cycle Tmck of the measurement clock MCK is varied according to a variation (diffusion quantity) of the oscillation frequency due to the frequency diffusion. This results in variations of the observed synchronizing signal cycle Tc and synchronizing signal period Tw. The diffusion quantity is typically expressed by a variation ±Tp % relative to the oscillation frequency as the reference.

The variations in synchronizing signal cycle Tc and synchronizing signal period Tw may cause wrong analysis of the specification of the image signal in the prior art image signal analysis technique. The technique of this embodiment executes an image signal specification routine described above in the course of analysis of the image signal, thus effectively preventing the wrong analysis of the specification of the image signal.

Figure 2:
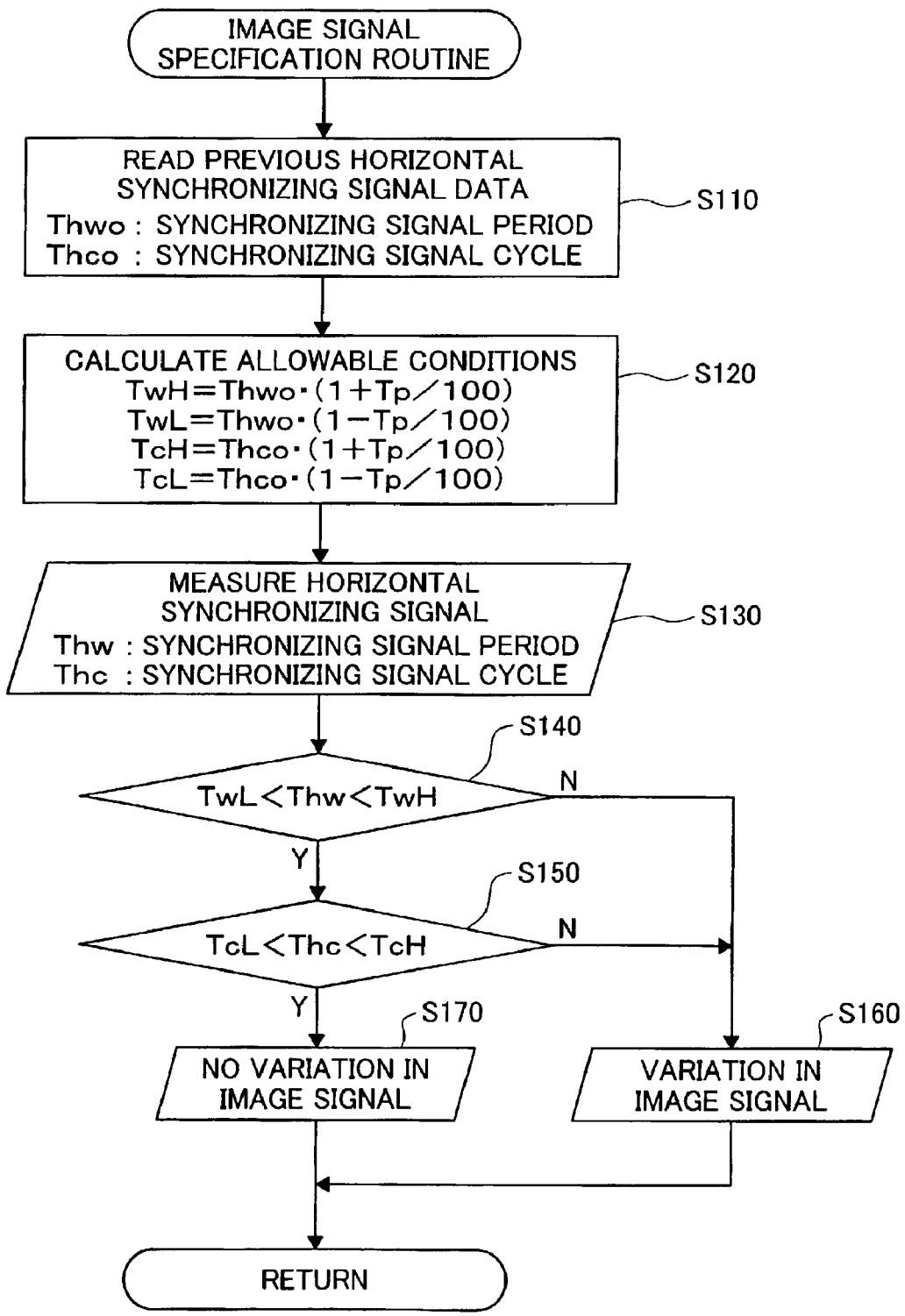
FIG. 2 is a flowchart showing a routine of an image signal specification process executed in the first embodiment.

FIG. 2 is a flowchart showing a routine of an image signal specification process executed in the first embodiment. The flowchart of FIG. 2 regards specification of image signal based on the horizontal synchronizing signal. When the program enters the image signal specification routine shown in FIG. 2, data measured in a previous cycle of the image signal specification routine and stored as a reference synchronizing signal period Thwo and a reference synchronizing signal cycle Thco are read from the memory as a standard of the specification at step S110. At subsequent step S120, allowable conditions of the synchronizing signal period Thw and the synchronizing signal cycle Thc are calculated according to Equations given below:

$$TwH = Thwo \cdot (1 + Tp/100) \tag{2a}$$

$$TwL = Thwo \cdot (1 - Tp/100) \tag{2b}$$

$$TcH = Thco \cdot (1 + Tp/100) \tag{2c}$$

$$TcL = Thco \cdot (1 - Tp/100) \tag{2d}$$

Here TwH denotes a maximum allowable condition of the horizontal synchronizing signal period Thw, and TcH denotes a maximum allowable condition of the horizontal synchronizing signal cycle Thc. These maximum allowable conditions respectively represent the maximum horizontal synchronizing signal period and the maximum horizontal synchronizing signal cycle at a maximum variation in oscillation frequency due to the frequency diffusion. TwL denotes a minimum allowable condition of the horizontal synchronizing signal period Thw, and TcL denotes a minimum allowable condition of the horizontal synchronizing signal cycle Thc. These minimum allowable conditions respectively represent the minimum horizontal synchronizing signal period and the minimum horizontal synchronizing signal cycle at a minimum variation in oscillation frequency due to the frequency diffusion.

At subsequent step S130, the horizontal synchronizing signal period Thw and the horizontal synchronizing signal cycle Thc are measured according to the following procedure. The H/V synchronizing signal measurement circuit 150 measures the count m corresponding to the horizontal synchronizing signal cycle Thc and the count n corresponding to the horizontal synchronizing signal period Thw. The horizontal synchronizing signal cycle Thc and the horizontal synchronizing signal period Thw are calculated from the observed counts m and n according to Expressions (1a) and (1b) given above. This specifies the horizontal synchronizing signal cycle Thc and the horizontal synchronizing signal period Thw. The horizontal synchronizing signal cycle Thc and the horizontal synchronizing signal period Thw may be calculated by the image signal analyzing sub-module 172a.

At step S140, it is determined whether or not the observed horizontal synchronizing signal period Thw is in an allowable range, which is greater than the minimum allowable condition TwL and smaller than the maximum allowable condition TwH.

When it is determined at step S140 that the observed horizontal synchronizing signal period Thw is out of the allowable range, a specification of 'variation in image signal' is set at step S160.

When it is determined at step S140 that the observed horizontal synchronizing signal period Thw is in the allowable range, on the other hand, the program proceeds to step S150.

At step S150, it is determined whether or not the observed horizontal synchronizing signal cycle Thc is in an allowable range, which is greater than the minimum allowable condition TcL and smaller than the maximum allowable condition TcH.

When it is determined at step S150 that the observed horizontal synchronizing signal cycle Thc is out of the allowable range, the specification of 'variation in image signal' is set at step S160.

When it is determined at step S150 that the observed horizontal synchronizing signal cycle Thc is in the allowable range, on the other hand, a specification of 'no variation in image signal' is set at step S170. In the case of the specification of 'no variation in image signal', the horizontal synchronizing signal period Thw and the horizontal synchronizing signal cycle Thc measured in the current cycle of the image signal specification routine are not used, but the previous values are kept as the reference synchronizing signal period Thwo and the reference synchronizing signal cycle Thco in a next cycle of the image signal specification routine. Alternatively the horizontal synchronizing signal period Thw and the horizontal synchronizing signal cycle Thc measured in the current cycle may be applied for the reference synchronizing signal period Thwo and the reference synchronizing signal cycle Thco in the next cycle of the image signal specification routine.

In the case of the specification of 'variation in image signal' in the above image signal specification routine, the image signal is analyzed based on the characteristics of the varied horizontal synchronizing signal. In the case of the specification of 'no variation in image signal', on the contrary, the current specification of the image signal is kept unchanged.

The image signal specification routine shown in FIG. 2 regards the image signal specification based on the horizontal synchronizing signal. In the actual state, the image signal specification based on the vertical synchronizing signal is naturally carried out. The image signal specification based on the vertical synchronizing signal is not specifically described here, since the processing follows the image signal specification routine of FIG. 2 with regard to the horizontal synchronizing signal, except that the horizontal synchronizing signal is replaced by the vertical synchronizing signal.

As described above, the image display apparatus 10 of the embodiment effectively prevents wrong analysis of the specification of the image signal, which results from a variation of the observed synchronizing signal characteristic values according to the variation in oscillation frequency of the frequency diffused clock. The frequency diffused clock is used as the system clock SYSCK. This arrangement desirably reduces the EMI noise arising in the image display apparatus.

In general, the greater diffusion quantity for the frequency diffusion of the system clock reduces the EMI noise by a greater degree. The greater diffusion quantity, however, widens the allowable range, in which the variation in observed synchronizing signal is allowed, in the process of analyzing the image signal. This widens the range of the specification of 'no variation in image signal' and worsens the accuracy of analysis of the image signal. In the image display apparatus of the embodiment, the diffusion quantity for the frequency diffusion of the system clock is determined by taking into account both the possible reduction of the EMI noise and the potential accuracy of analysis of the image signal.

B. Second Embodiment

B1. Construction of Image Display Apparatus

Figure 3:
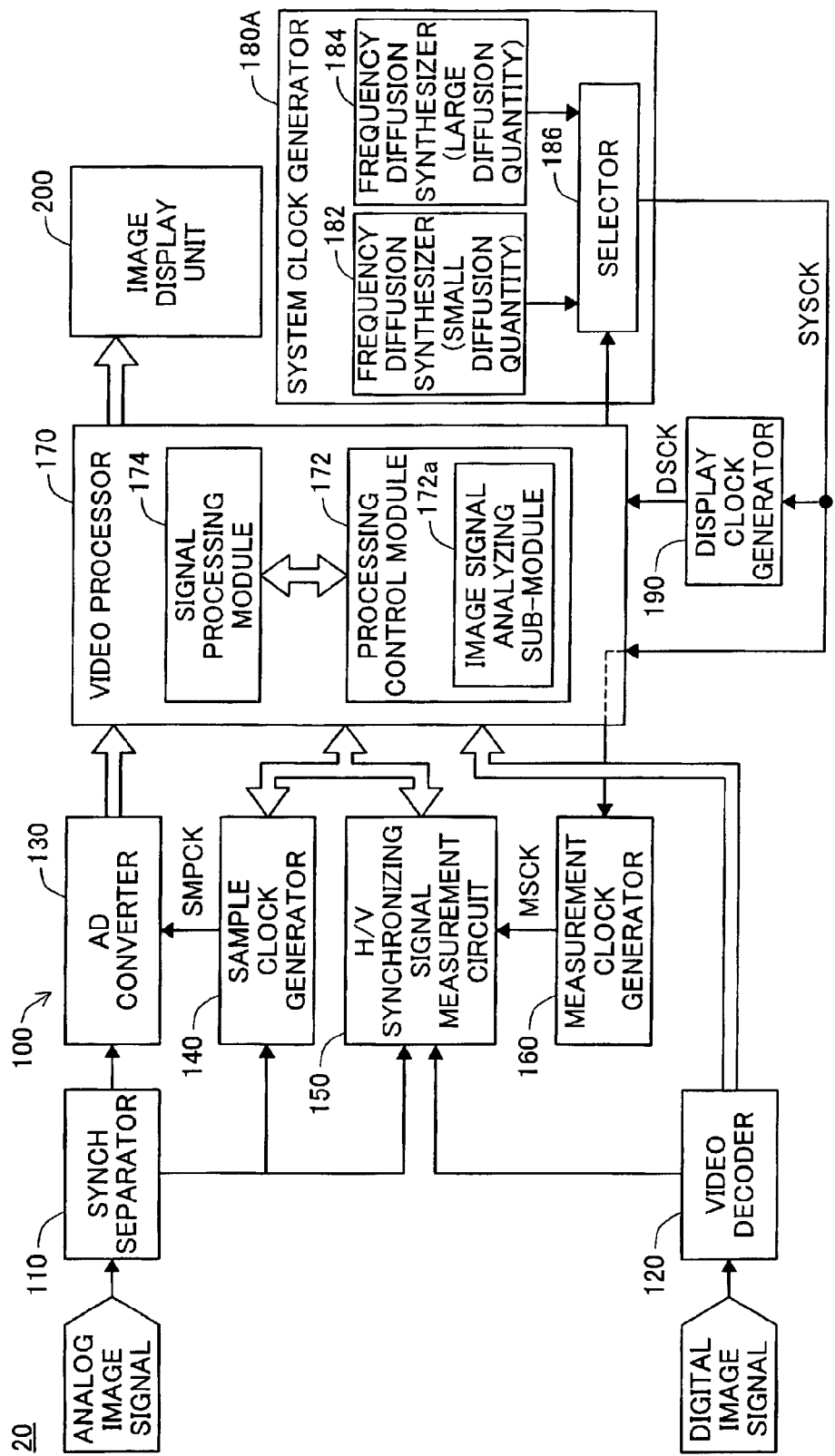
FIG. 3 is a block diagram schematically illustrating the construction of another image display apparatus in a second embodiment of the present invention.

FIG. 3 is a block diagram schematically illustrating the construction of another image display apparatus 20 in a second embodiment of the present invention. The image display apparatus 20 of the second embodiment has a construction similar to that of the image display apparatus 10 of the first embodiment shown in FIG. 1, except that the system clock generator 180 is replaced by another system clock generator 180A. The following description regards the differences from the first embodiment caused by the replacement with the system clock generator 180A.

The system clock generator 180A includes a first frequency diffusion synthesizer 182 of a relatively small diffusion quantity, a second frequency diffusion synthesizer 184 of a relatively large diffusion quantity, and a selector 186 that selects one of two clocks output from these two synthesizers 182 and 184.

Like the system clock generator 180 of the first embodiment, a diversity of clock generators that output the frequency diffused clock are applicable for the first frequency diffusion synthesizer 182 and the second frequency diffusion synthesizer 184. The first frequency diffusion synthesizer 182 has a smaller diffusion quantity ±T %, compared with the second frequency diffusion synthesizer 184. For example, the clock generator MK1705 is capable of selecting one among three diffusion quantities ±0.5%, ±1%, and ±1.25% according to two select inputs S1 and S0. One clock generator MK1705 with the setting of the diffusion quantity equal to ±0.5% and another clock generator MK1705 with the setting of the diffusion quantity equal to ±1% may respectively be applied for the first frequency diffusion synthesizer 182 and the second frequency diffusion synthesizer 184.

In the system clock generator 180A, the selector 186 selects the second frequency diffusion synthesizer 184 at the time of regular operation, while selecting the first frequency diffusion synthesizer 182 at the time of analysis of the image signal. The selector 186 has a general circuit to prevent superimposition of a noise like sag on the clock output as the system clock SYSCK at the time of changeover between the first frequency diffusion synthesizer 182 and the second frequency diffusion synthesizer 184.

B2. Analysis of Image Signal

Figure 4:
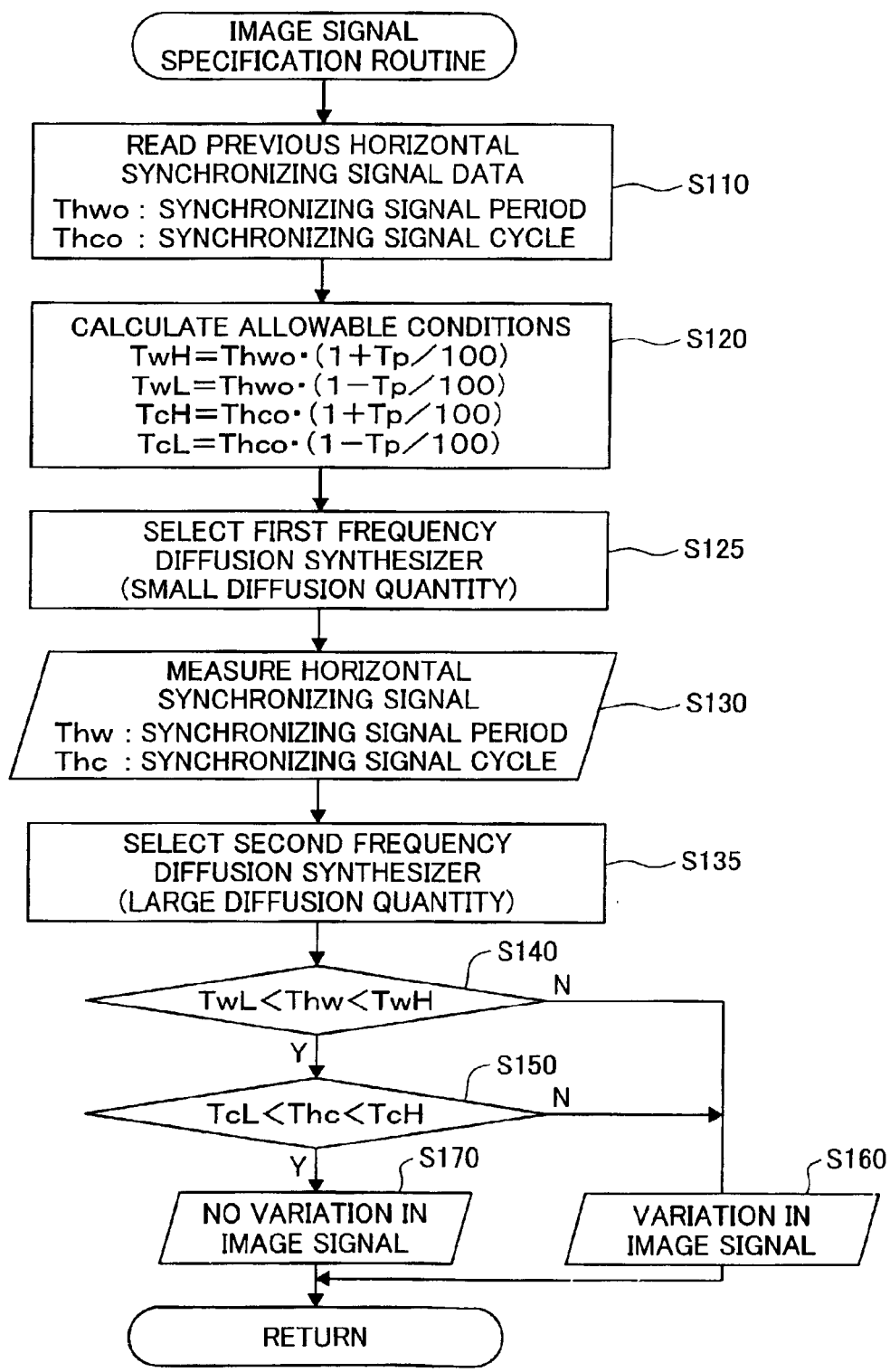
FIG. 4 is a flowchart showing another routine of the image signal specification process executed in the second embodiment.

FIG. 4 is a flowchart showing another routine of the image signal specification process executed in the second embodiment. The image signal specification routine of the second embodiment includes an additional step S125 between steps S120 and S130 and an additional step S135 between steps S130 and S140 in the image signal specification routine of the first embodiment shown in FIG. 2. The diffusion quantity of the first frequency diffusion synthesizer 182 is applied for the diffusion quantity ±T % of the frequency diffusion used in calculation of the allowable conditions at step S120.

Prior to the measurement of the horizontal synchronizing signal period Thw and the horizontal synchronizing signal cycle Thc at step S130, the first frequency diffusion synthesizer 182 is selected as the system clock generator 180A at step S125. The diverse series of processing in the image display apparatus 20 are executed with the system clock SYSCK of a narrower range of the variation in oscillation frequency, which is diffused with a smaller diffusion quantity than that of the second frequency diffusion synthesizer 184, as the reference.

The process of step S130 utilizes the measurement clock MCK generated in response to the system clock SYSCK output from the first frequency diffusion synthesizer 182 to carry out measurement of the horizontal synchronizing signal period Thw and the horizontal synchronizing signal cycle Thc.

After the measurement at step S130, the second frequency diffusion synthesizer 184 is selected as the system clock generator 180A at step S135. The diverse series of processing in the image display apparatus 20 are executed with the system clock SYSCK of a wider range of the variation in oscillation frequency, which is diffused with a greater diffusion quantity than that of the first frequency diffusion synthesizer 182, as the reference.

The specification of the image signal is carried out at steps S140 through S170 as discussed in the first embodiment with reference to the flowchart of FIG. 2.

As described above, the image display apparatus 20 of the second embodiment effectively prevents wrong analysis of the specification of the image signal, which results from a variation of the observed synchronizing signal characteristic values according to the variation in oscillation frequency of the frequency diffused clock. The frequency diffused clock is used as the system clock SYSCK. This arrangement desirably reduces the EMI noise arising in the image display apparatus.

The technique of the second embodiment has advantages discussed below.

As described previously in the first embodiment, the greater diffusion quantity of the system clock SYSCK and the greater variation in oscillation frequency are preferable for reduction of the EMI noise. For the higher accuracy of analysis of the image signal, however, the smaller diffusion quantity is preferable. Especially preferable are the diffusion quantity of 0% and the substantially fixed oscillation frequency.

The technique of the first embodiment determines the diffusion quantity for the frequency diffusion of the system clock SYSCK by taking into account both the possible reduction of the EMI noise and the potential accuracy of analysis of the image signal. The diffusion quantity for the frequency diffusion of the system clock SYSCK can thus not be set according to a desired reduction of the EMI noise.

The technique of the second embodiment changes over the system clock SYSCK at the time of analysis of the image signal and at the time of regular operation. The diffusion quantity of the system clock SYSCK at the time of regular operation can thus be set according to a desired reduction of the EMI noise. The smaller diffusion quantity is set at the time of analysis of the image signal, compared with that at the time of regular operation. This arrangement ensures a relatively high accuracy of analysis of the image signal, while reducing the EMI noise to some extent. The diffusion quantity of the system clock SYSCK at the time of analysis of the image signal is smaller than that at the time of regular operation. It is accordingly expected that the EMI noise at the time of analysis of the image signal is greater than the EMI noise at the time of regular operation. The frequency diffusion of the system clock SYSCK at the time of analysis of the image signal, however, reduces the EMI noise to some extent. It takes an extremely short time for analysis of the image signal, so that the analysis of the image signal hardly affects the actual measurement of the EMI noise. The smaller diffusion quantity of the system clock SYSCK at the time of analysis of the image signal than that at the time of regular operation accordingly does not cause any significant problems.

In the system clock generator 180A of the second embodiment, the selector 186 selects one of the output of the first frequency diffusion synthesizer 182 and the output of the second frequency diffusion synthesizer 184 as the system clock SYSCK. Namely one of the two frequency diffused clocks having different diffusion quantities is selectively output. A similar system clock generator may be constructed by utilizing a synthesizer that changes over the diffusion quantity of the output clock at the time of regular operation and at the time of analysis of the image signal. For example, the clock generator MK1705 is capable of selecting the diffusion quantity according to the two select inputs S1 and S2 as mentioned previously. A variation in data given to the select inputs S1 and S0 at the time of regular operation and at the time of analysis of the image signal enables a selection between the two frequency diffused clocks having different diffusion quantities and output of the selected frequency diffused clock as the system clock SYSCK.

C. Third Embodiment

C1. Construction of Image Display Apparatus

Figure 5:
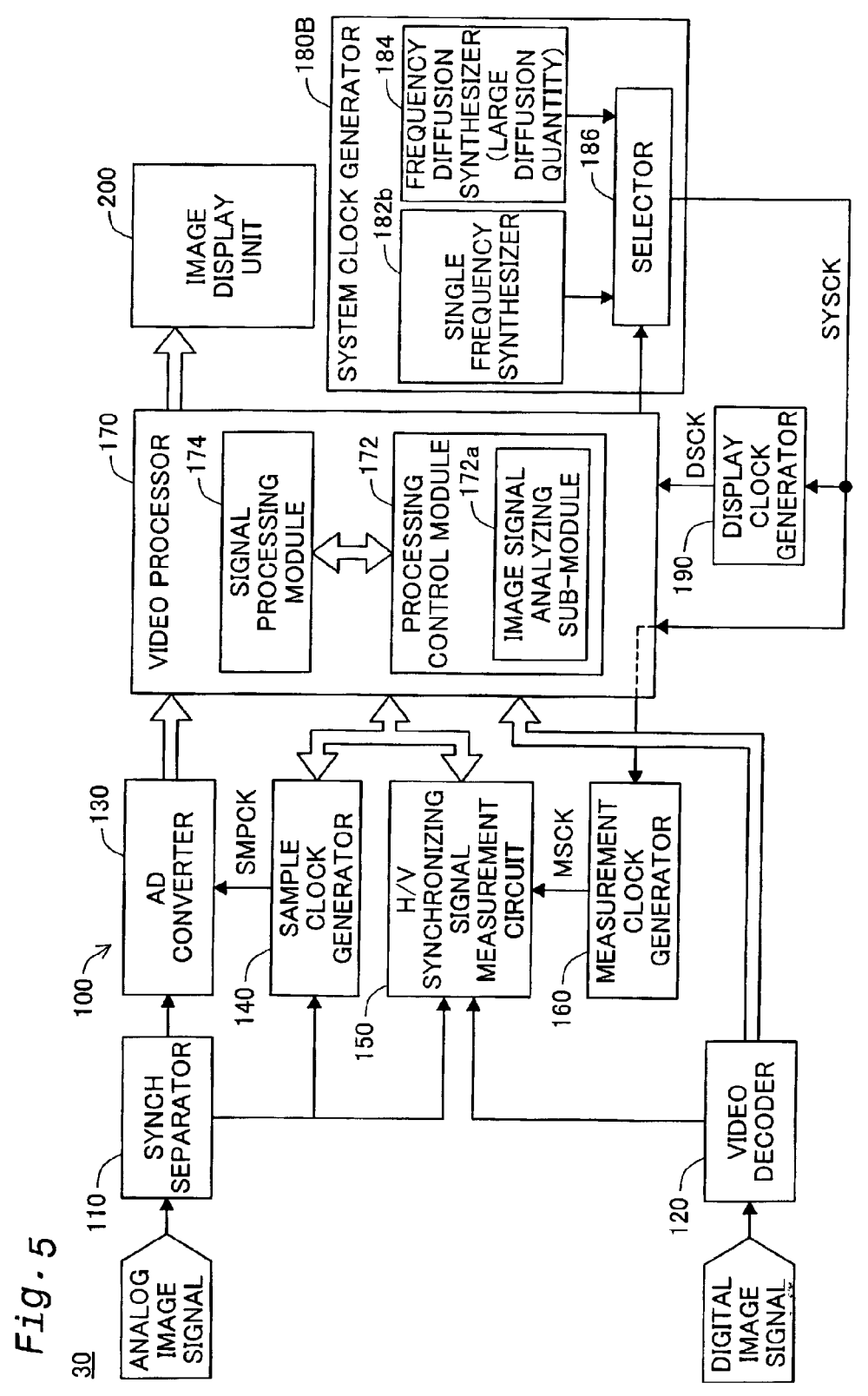

FIG. 5 is a block diagram schematically illustrating the construction of still another image display apparatus 30 in a third embodiment of the present invention. The image display apparatus 30 of the third embodiment has a construction similar to that of the image display apparatus 20 of the second embodiment shown in FIG. 3, except that the system clock generator 180A is replaced by another system clock generator 180B. The following description regards the differences from the second embodiment caused by the replacement with the system clock generator 180B.

The system clock generator 180B includes a single frequency synthesizer 182b, in place of the first frequency diffusion synthesizer 182 of the system clock generator 180A.

The single frequency synthesizer 182b is a clock generator that outputs a clock of a substantially fixed oscillation frequency, instead of the frequency diffused clock. A diversity of clock generators, such as a general PLL-based synthesizer and a quartz oscillator are applicable for the single frequency synthesizer 182b.

The system clock generator 180B selects the frequency diffusion synthesizer 184 at the time of regular operation, while selecting the single frequency synthesizer 182b at the time of analysis of the image signal.

C2. Analysis of Image Signal

Figure 6:
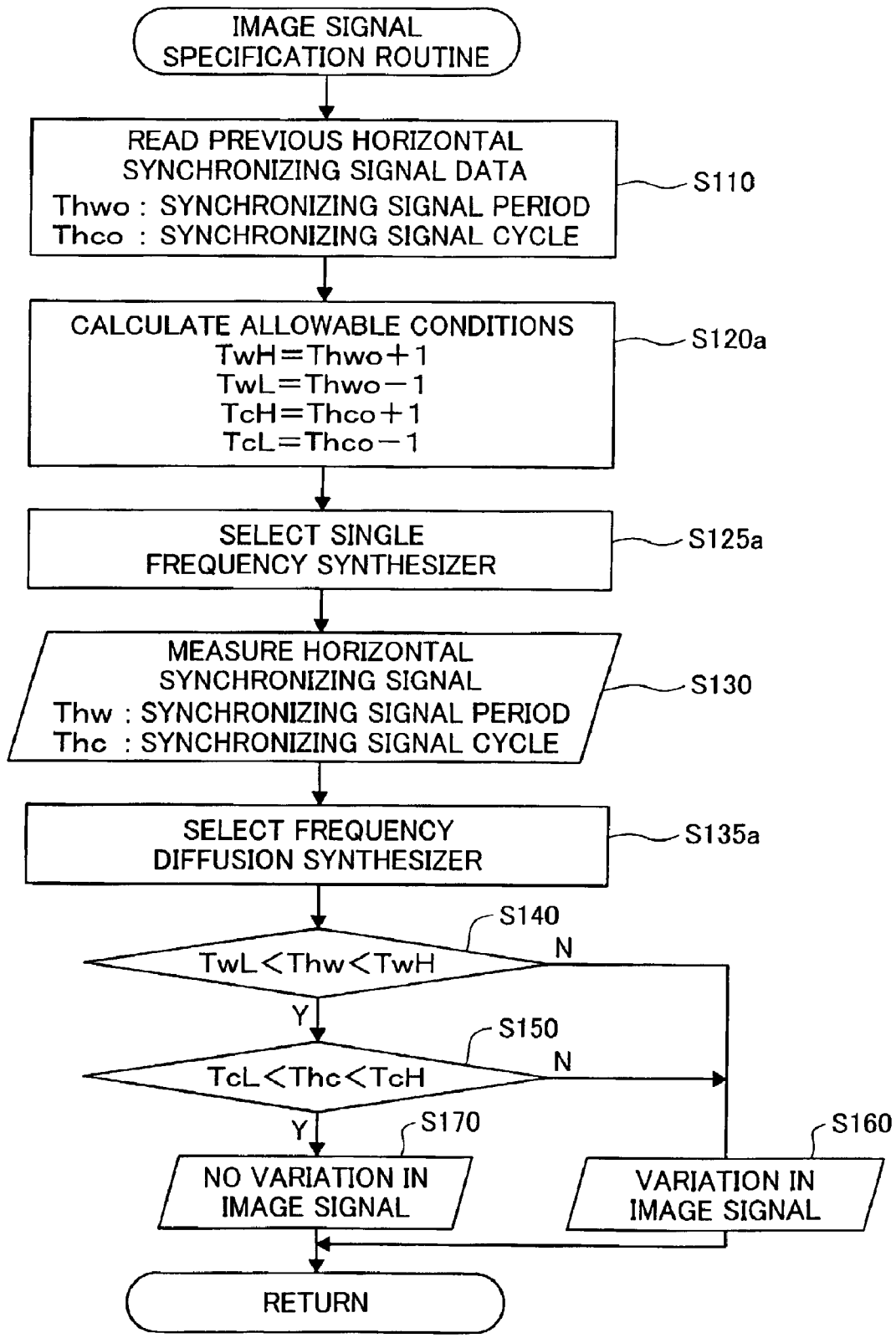
FIG. 6 is a flowchart showing still another routine of the image signal specification process executed in the third embodiment.
Figure 7:
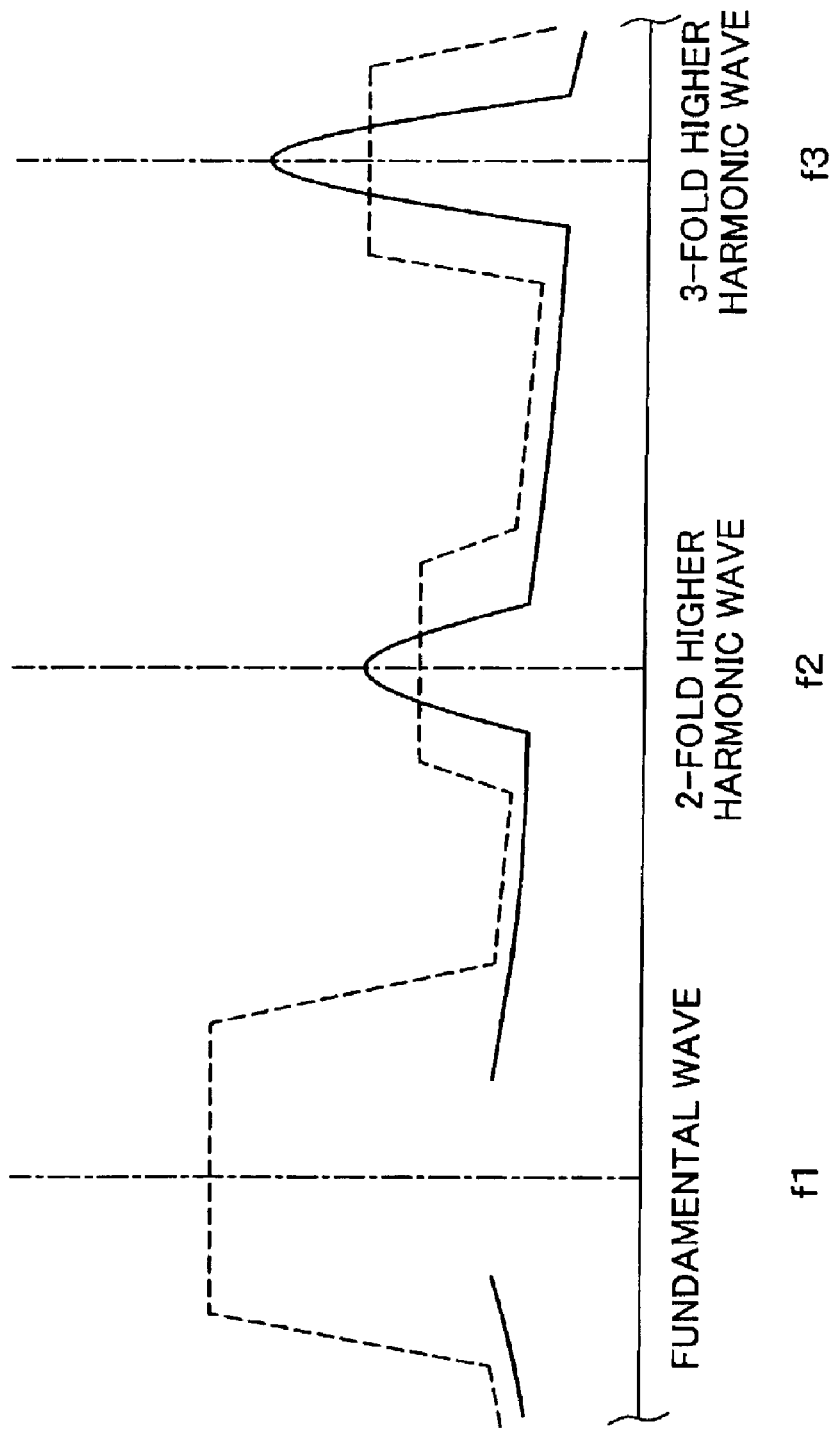
FIG. 7 shows a frequency spectrum of a clock.

FIG. 6 is a flowchart showing still another routine of the image signal specification process executed in the third embodiment. The image signal specification routine of the third embodiment has steps S120a, S125a, and S135a, in place of steps S120, S125, and S135 in the image signal specification routine of the second embodiment shown in the flowchart of FIG. 4.

At the time of analysis of the image signal, the output of the single frequency synthesizer 182b is selected as the system clock SYSCK as mentioned above. There is no variation in synchronizing signal according to the diffusion quantity ±Tp %, unlike the first and the second embodiments. At step S120a, the allowable conditions of the synchronizing signal period Thw and the synchronizing signal cycle Thc are thus calculated according to Equations given below:

$$TwH=Thwo+1 \tag{3a}$$

$$TwL=Thwo-1 \tag{3b}$$

$$TcH=Thco+1 \tag{3c}$$

$$TcL=Thco-1 \tag{3d}$$

Prior to the measurement of the horizontal synchronizing signal period Thw and the horizontal synchronizing signal cycle Thc at step S130, the single frequency synthesizer 182b is selected as the system clock generator 180B at step S125a. The diverse series of processing in the image display apparatus 30 are executed with the system clock SYSCK having the substantially fixed oscillation frequency as the reference.

The process of step S130 utilizes the measurement clock MCK generated in response to the system clock SYSCK output from the single frequency synthesizer 182b to carry out measurement of the horizontal synchronizing signal period Thw and the horizontal synchronizing signal cycle Thc.

After the measurement at step S130, the frequency diffusion synthesizer 184 is selected as the system clock generator 180B at step S135a. The diverse series of processing in the image display apparatus 30 are executed with the frequency diffused system clock SYSCK as the reference.

The specification of the image signal is carried out at steps S140 through S170 as discussed in the first embodiment with reference to the flowchart of FIG. 2.

The image display apparatus 30 of the third embodiment changes over the system clock as the standard of operations, that is, selects the clock having the substantially fixed oscillation frequency (the single frequency clock) at the time of analysis of the image signal while selecting the frequency diffused clock at the time of regular operation. This arrangement desirably prevents wrong analysis of the specification of the image signal, and reduces the EMI noise at the time of regular operation. The diffusion quantity of the system clock at the time of regular operation can be set according to a desired reduction of the EMI noise. The system clock output at the time of analysis of the image signal has the substantially fixed oscillation frequency. This arrangement further enhances the accuracy of analysis of the image signal, compared with the arrangement of the second embodiment. The substantially fixed oscillation frequency of the system clock increases the EMI noise at the time of analysis of the image signal. It takes, however, an extremely short time for analysis of the image signal, so that the analysis of the image signal hardly affects the actual measurement of the EMI noise. In the case where the EMI noise at the time of analysis of the image signal is not negligible, the technique of the second embodiment is preferable over the technique of the third embodiment.

In the system clock generator 180B of the third embodiment, the selector 186 selects one of the output of the single frequency synthesizer 182b and the output of the frequency diffusion synthesizer 184 as the system clock SYSCK. Namely one of the two different clocks is selectively output. A similar system clock generator may be constructed by utilizing a synthesizer that carries out a changeover between frequency diffusion of the output clock and no frequency diffusion. For example, such a synthesizer selects an ON-OFF state of frequency diffusion according to an enable input LEE. A variation in data given to the enable input LEE at the time of regular operation and at the time of analysis of the image signal enables a selection between the single frequency clock and the frequency diffused clock and output of the selected clock as the system clock SYSCK.

The above embodiments and their modifications are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

The scope and spirit of the present invention are indicated by the appended claims, rather than by the foregoing description.

What is claimed is:

1. An image processing apparatus that works in response to a frequency diffused clock as a reference to process an input image signal, the image processing apparatus comprising:

a system clock generation module that outputs a system clock, which is a standard of operations;

a synchronizing signal measurement module that measures a synchronizing signal characteristic value, which includes at least a synchronizing signal period and a synchronizing signal cycle corresponding to the input image signal, relative to a measurement clock generated from the system clock as a reference; and an image signal analyzing module that analyzes the input image signal based on the observed synchronizing signal characteristic value, wherein the system clock generation module varies an oscillation frequency and outputs a frequency diffused clock as the system clock, and the image signal analyzing module determines that specification of the input image signal is changed when the observed synchronizing signal characteristic value is out of a predetermined range, while determining that the specification of the input image signal is unchanged when the observed synchronizing signal characteristic value is in the predetermined range, the image signal analyzing module analyzing the input image signal according to a result of the determination.

2. An image processing apparatus in accordance with claim 1, wherein the system clock generation module outputs a first frequency diffused clock, which is obtained by frequency diffusion with a first diffusion quantity, as the system clock during a measurement time period when the synchronizing signal measurement module measures the synchronizing signal characteristic value, while outputting a second frequency diffused clock, which is obtained by frequency diffusion with a second diffusion quantity, as the system clock during a time period other than the measurement time period.

3. An image processing apparatus in accordance with claim 2, wherein the first diffusion quantity is smaller than the second diffusion quantity.

4. An image processing apparatus in accordance with claim 2, wherein the system clock generation module comprises:

a first frequency diffusion clock generation sub-module that generates the first frequency diffused clock;

a second frequency diffusion clock generation sub-module that generates the second frequency diffused clock; and a selector sub-module that selects one of the first frequency diffused clock and the second frequency diffused clock.

5. An image processing apparatus in accordance with claim 3, wherein the system clock generation module comprises:

a first frequency diffusion clock generation sub-module that generates the first frequency diffused clock;

a second frequency diffusion clock generation sub-module that generates the second frequency diffused clock; and a selector sub-module that selects one of the first frequency diffused clock and the second frequency diffused clock.

6. An image processing apparatus in accordance with claim 2, wherein the system clock generation module comprises a frequency diffusion clock generation sub-module that carries out a selection between the first diffusion quantity and the second diffusion quantity and generates a frequency diffused clock corresponding to the selected diffusion quantity.

7. An image processing apparatus in accordance with claim 3, wherein the system clock generation module comprises a frequency diffusion clock generation sub-module that carries out a selection between the first diffusion quantity and the second diffusion quantity and generates a frequency diffused clock corresponding to the selected diffusion quantity.

8. An image processing apparatus that works in response to a frequency diffused clock as a reference to process an input image signal, the image processing apparatus comprising:

a system clock generation module that outputs a system clock, which is a standard of operations;

a synchronizing signal measurement module that measures a synchronizing signal characteristic value, which includes at least a synchronizing signal period and a synchronizing signal cycle corresponding to the input image signal, relative to a measurement clock generated from the system clock as a reference; and an image signal analyzing module that analyzes the input image signal based on the observed synchronizing signal characteristic value, wherein the system clock generation module outputs a single frequency clock having a substantially fixed oscillation frequency as the system clock during a measurement time period when the synchronizing signal measurement module measures the synchronizing signal characteristic value, while varying an oscillation frequency and outputting a frequency diffused clock as the system clock during a time period other than the measurement time period, and the image signal analyzing module determines that specification of the input image signal is changed when the observed synchronizing signal characteristic value is out of a predetermined range, while determining that the specification of the input image signal is unchanged when the observed synchronizing signal characteristic value is in the predetermined range, the image signal analyzing module analyzing the input image signal according to a result of the determination.

9. An image processing apparatus in accordance with claim 8, wherein the system clock generation module comprises:

a single frequency clock generation sub-module that generates the single frequency clock;

a frequency diffusion clock generation sub-module that generates the frequency diffused clock; and a selector sub-module that selects one of the single frequency clock and the frequency diffused clock.

10. An image processing apparatus in accordance with claim 8, wherein the system clock generation module comprises a frequency diffusion clock generation sub-module that carries out a selection between frequency diffusion and non-frequency diffusion and generates one of the single frequency clock and the frequency diffused clock.

* * * * *